G. T. PETERS & G. E. PETERS.
Bath-Tubs for Bird-Cages.

No. 138,692.　　　　　　　　　　　　　Patented May 6, 1873.

Witnesses　　　　　　　　　　　　　　Inventors:

UNITED STATES PATENT OFFICE.

GEORGE T. PETERS AND GEORGE E. PETERS, OF JERSEY CITY, NEW JERSEY.

IMPROVEMENT IN BATH-TUBS FOR BIRD-CAGES.

Specification forming part of Letters Patent No. 138,692, dated May 6, 1873; application filed March 6, 1873.

*To all whom it may concern:*

Be it known that we, GEORGE T. PETERS and GEORGE E. PETERS, of Jersey City, in the county of Hudson and State of New Jersey, have invented certain new and useful Improvements in Bath-Tubs and Drinking-Fountains for Birds, of which the following is a specification:

This invention has for its object to furnish a bath-tub and drinking-fountain for use in bird-cages, &c., which is so constructed that the excrement or fecal matter of the birds shall not be liable to render the water impure, which is generally the cause of great mortality among birds when the ordinary open cups or water-receptacles are employed, another advantage being the prevention of the displacement or splashing of the water when the bird enters the bath, which causes the soiling of the walls of the room or cage. To this end, the invention consists in combining, with a bath-tub or drinking-fountain, a shield or protective cover which is made of glass or porcelain, said shield being made separate from the water-receptacle and retained in proper relation thereto by any suitable means, or the receptacle and shield may be formed in one piece, as preferred or found most convenient.

Figure 1:
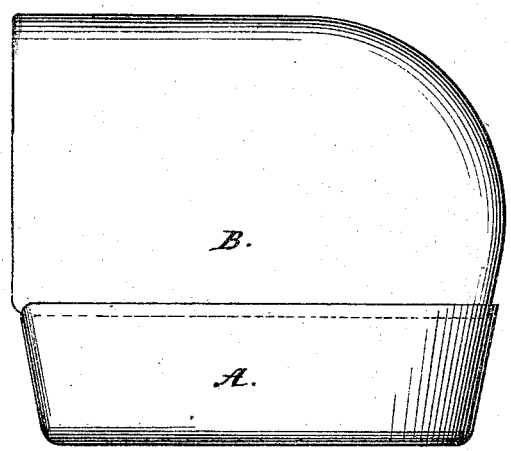
Figure 2:
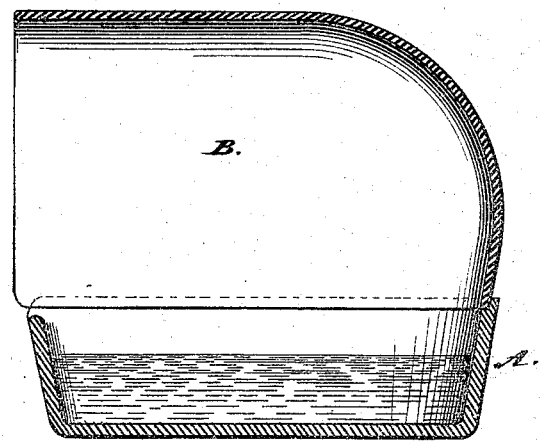
Figure 3:
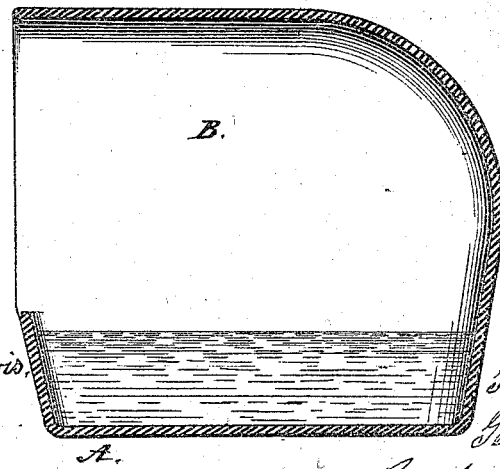

In the drawing, Figure 1 is a side view of a bath-tub or drinking-fountain provided with a detachable or separate shield or cover. Fig. 2 is a central longitudinal section of the same. Fig. 3 is a view of the invention representing the water-receptacle and protective cover formed in one piece.

The bath-tub or drinking-fountain proper is designated at A, and may be made either of glass, porcelain, or other vitreous material. A cover or shield, B, made of glass or porcelain, is applied to the water-receptacle, and is retained in proper relation thereto when made detachable or separate, as shown in Figs. 1 and 2, by ledges, shoulders, or other equivalent devices for effecting the desired result. The cover or shield is made of either of the materials used in the construction of the bath-tub or water-receptacle above stated, and its form may either be a semi-cylinder, prism, dome, or arch, as found most expedient for the purpose. In the present instance the cover is made of an arched or curved shape, with its edges resting upon or supported by the rim of the water-receptacle so as to be retained in position by its own weight without resorting to other fastening devices. One end of the shield is made open so as to form an aperture for the entrance of the bird into the bath, and the opposite end is closed, as shown in the drawing, but this is immaterial, as it may as well be made open for admitting the bird at either end of the bath.

A shield or cover to a bath-tub or drinking-fountain, as shown, possesses many decided and obvious advantages, the most important of which is to prevent the excrement or fecal matters of the birds from falling into the water, which would render the same impure or poisonous in a comparatively short time, tending to produce the death of the bird. An open receptacle as now generally used is often the cause of young birds being drowned when precipitated from their nests into the water. This our invention entirely obviates, as is apparent. All splashing or displacement of the water, causing the soiling of the cage and walls of the room, is rendered impossible by the water-shield or cover, while not preventing the free movement of the bird in the bath, as the cover can be made of any desired size and shape, one of a dome or arched shape being preferred on account of the increased area or space which it offers.

We wish it to be understood that we do not confine ourselves to a detachable shield or water-protecting cover, as the same may be in one piece or integral with the water-receptacle, as shown in Fig. 3 of the drawing, which is a covered bath-tub or water-receptacle possessing the manifold advantages specified.

It will be perceived that the form given to the dome or shield permits its rounded end to fit nicely the curvature of the cage.

Having thus fully described our invention, what we claim as new, and desire to secure by Letters Patent, is—

The shield or dome B, with rounded end, sides, and top, made of a single piece of material, and with open front, as shown, and fitted upon the bath-tub A, substantially as and for the purpose described.

In testimony that we claim the foregoing we have hereunto set our hands this 20th day of February, 1873.

GEORGE T. PETERS.
GEORGE E. PETERS.

Witnesses:
BENJ. SHACKELTON,
GEO. RITTENHOUSE.